United States Patent
Jeng et al.

(10) Patent No.: US 9,169,357 B2
(45) Date of Patent: Oct. 27, 2015

(54) POLYIMIDE COPOLYMERS AND METHOD FOR FABRICATING PATTERNED METAL OXIDE LAYERS

(75) Inventors: Jhy-Long Jeng, Junghe (TW); Jeng-Yu Tsai, Chiayi (TW); Shur-Fen Liu, Baoshan Township, Hsinchu County (TW); Chin-Ching Lin, Taichung (TW); Yu-Chun Chen, Zhongli (TW); Wen-Ching Sun, Hsinchu (TW); Jinn-Shing King, Hsinchu (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 927 days.

(21) Appl. No.: 13/336,606

(22) Filed: Dec. 23, 2011

(65) Prior Publication Data
US 2013/0029049 A1    Jan. 31, 2013

(30) Foreign Application Priority Data

Jul. 28, 2011  (TW) .................................. 100126738

(51) Int. Cl.
*C08G 73/10* (2006.01)
*B05D 1/32* (2006.01)
(Continued)

(52) U.S. Cl.
CPC .............. *C08G 73/10* (2013.01); *C03C 17/253* (2013.01); *C08G 73/101* (2013.01);
(Continued)

(58) Field of Classification Search
CPC ....................................................... C08G 73/10
USPC .................................. 528/170, 322; 427/272
See application file for complete search history.

(56) References Cited

U.S. PATENT DOCUMENTS

| 3,652,500 A | 3/1972 | Peterson |
| 4,029,876 A | 6/1977 | Beatty et al. |

(Continued)

FOREIGN PATENT DOCUMENTS

| CN | 101423608 A | 5/2009 |
| WO | WO2009/084850 A2 | 7/2009 |

OTHER PUBLICATIONS

Chinese Office Action dated Jul. 28, 2014, as issued in corresponding China Patent Application No. 201110275376X.
(Continued)

*Primary Examiner* — Duc Truong
(74) *Attorney, Agent, or Firm* — Muncy, Geissler, Olds & Lowe, P.C.

(57) ABSTRACT

A polyimide copolymer represented by formula (I) or formula (II) is provided.

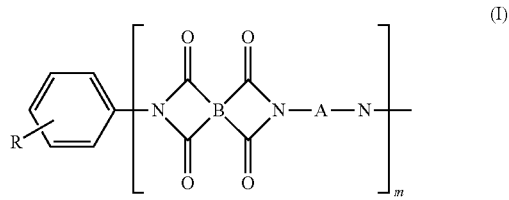

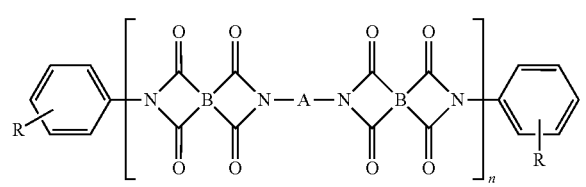

In formula (I) or formula (II), B is a cycloaliphatic group or aromatic group, A is an aromatic group, R is hydrogen or phenyl, and m and n are 20-50. The invention also provides a method for fabricating a patterned metal oxide layer.

16 Claims, 3 Drawing Sheets

(51) Int. Cl.
*C08L 79/08* (2006.01)
*C03C 17/25* (2006.01)
C08G 73/00 (2006.01)
B05D 1/00 (2006.01)

(52) U.S. Cl.
CPC ....... *C08G 73/1017* (2013.01); *C08G 73/1039* (2013.01); *C08G 73/1046* (2013.01); *C08G 73/1064* (2013.01); *C08G 73/1075* (2013.01); *C08G 73/1078* (2013.01); *C08L 79/08* (2013.01); *C03C 2218/34* (2013.01)

(56) References Cited

U.S. PATENT DOCUMENTS

| 4,451,971 A | 6/1984 | Milgram |
| 5,281,690 A | 1/1994 | Flaim et al. |
| 5,426,071 A | 6/1995 | Summers |
| 5,654,128 A | 8/1997 | Hsu |
| 5,766,808 A | 6/1998 | Linde et al. |

OTHER PUBLICATIONS

Lee et al., "A Simple and Effective Lift-Off with Positive Photoresist" J. Micromech. and Microeng., (2005), pp. 2136-2140, vol. 15.
Witman et al., "A Simple BiLayer Lift-off Process", Microelectronic Engineering, (1990), pp. 549-552, vol. 11.
Chinese Office Action dated Feb. 7, 2014 from application No. 201110275376.X.

POLYIMIDE COPOLYMERS AND METHOD FOR FABRICATING PATTERNED METAL OXIDE LAYERS

CROSS REFERENCE TO RELATED APPLICATIONS

This Application claims priority of Taiwan Patent Application No. 100126738, filed on Jul. 28, 2011, the entirety of which is incorporated by reference herein.

BACKGROUND

1. Field

The disclosure relates to a copolymer, and more particularly to a polyimide copolymer and method for fabricating a patterned metal oxide layer.

2. Description of the Related Art

Polyimide (PI) has been widely applied in the semiconductor and display industries due to its thermal stability and excellent mechanical, electric and chemical-resistant properties. Polyimide is a thermosetting resin material. After a high-temperature (350° C. and above) process, it is very difficult to dissolve polyimide in usual solvents or amine strippers due to excellent chemical-resistance, restricting its applications. Therefore, the so-called soluble polyimide which forms a larger free volume between the molecules thereof through a specific molecular structure design to increase solubility has subsequently been developed. The soluble polyimide can still maintain its solubility under a 300° C. and below process temperature environment. However, during a high-temperature (350° C. and above) process, the molecular chains of the polyimide will mutually stack and tend to lower the energy and then shrink free volume which causes dramatic descent of solubility and results in insolubility.

Generally, during a metal oxide patterning process, a "lift-off" method is adopted to form metal oxide patterns, among others, although the soluble polyimide is widely used in the "lift-off" process, the process temperature must be limited to 350° C. and below. It is problematic if the soluble polyimide is used in a high-temperature metal oxide deposition process which requires 350° C. and above process temperatures. Therefore, development of a polyimide material which can still be dissolved in an organic solvent after a high-temperature (350° C. and above) process is required. Specifically, a temporary protective film capable of enduring high temperatures (350° C. and above) under metal oxide patterning processes, and finally, be removed using solvents to form metal oxide patterns is required.

BRIEF SUMMARY

One embodiment provides a polyimide copolymer represented by formula (I) or formula (II):

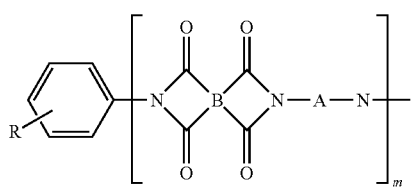

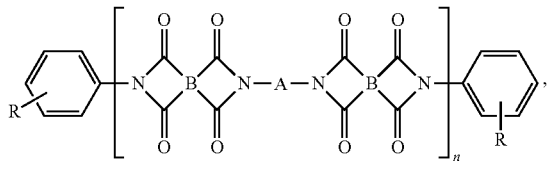

wherein B is a cycloaliphatic group or aromatic group; A is an aromatic group; R is hydrogen or phenyl; and m and n are 20-50.

One embodiment provides a method for preparing a polyimide copolymer, comprising: mixing a diamine and a dianhydride together to form a polyimide precursor; mixing an aniline and the polyimide precursor together to form a reaction mixture; and imidizing the reaction mixture to prepare a polyimide copolymer.

One embodiment provides a method for fabricating a patterned metal oxide layer, comprising the following steps: providing a substrate; forming a patterned polyimide layer on the substrate, wherein the polyimide layer is prepared by the disclosed method for preparing a polyimide copolymer; forming a metal oxide layer on the substrate and the patterned polyimide layer; and removing the patterned polyimide layer to form a patterned metal oxide layer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein.

DETAILED DESCRIPTION

One embodiment provides a polyimide copolymer represented by formula (I) or formula (II).

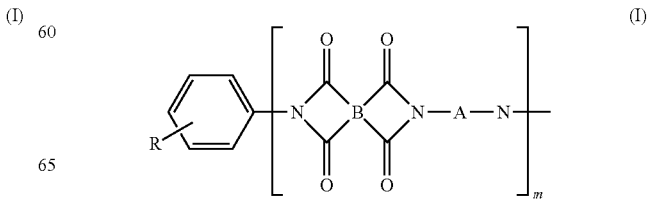

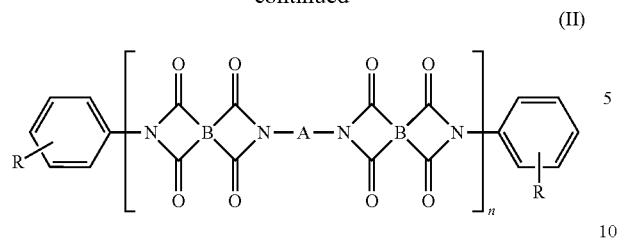

In formula (I) or formula (II), B may be a cycloaliphatic group or aromatic group, for example

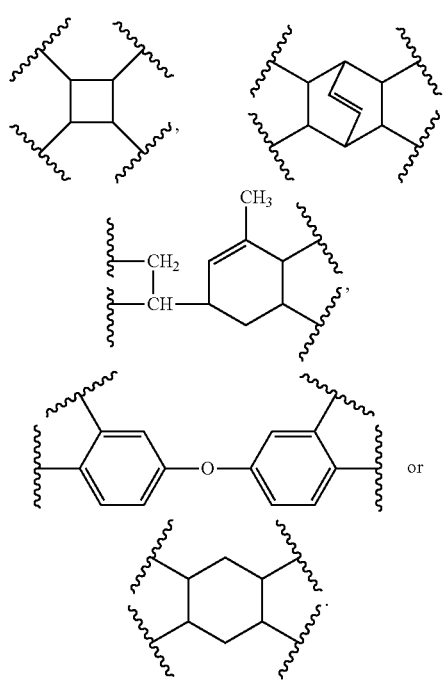

A may be an aromatic group, for example

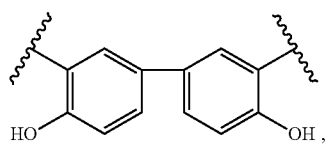

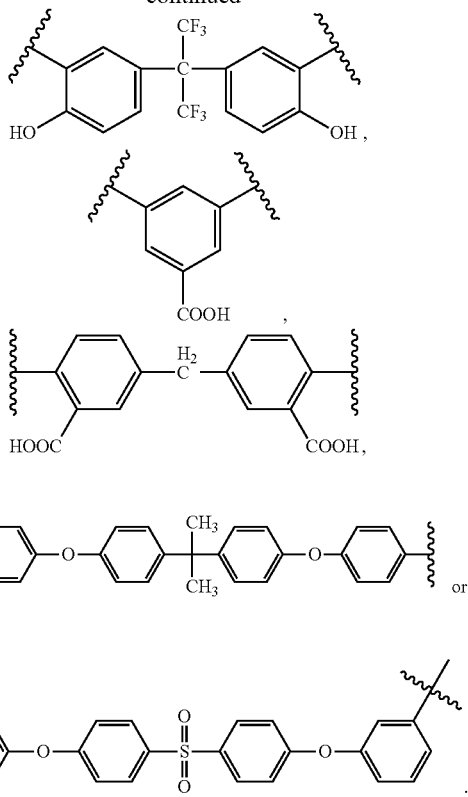

R may be hydrogen or phenyl. m and n may be 20-50.

The polyimide copolymer has an aniline terminal.

In an embodiment, the polyimide copolymer has a weight-average molecular weight of about 6,000-15,000, preferably 6,000-12,000.

One embodiment provides a method for preparing a polyimide copolymer, comprising the following steps. First, a diamine and a dianhydride are mixed together to form a polyimide precursor. Next, an aniline and the polyimide precursor are mixed together to form a reaction mixture. The reaction mixture is then imidized to prepare a polyimide copolymer. In an embodiment, after the aniline and the polyimide precursor are mixed together and reacted for 3-8 hours, preferably 4 hours, the reaction temperature is raised to 160-200° C., preferably 180° C., to imidize the reaction mixture.

The diamine may be

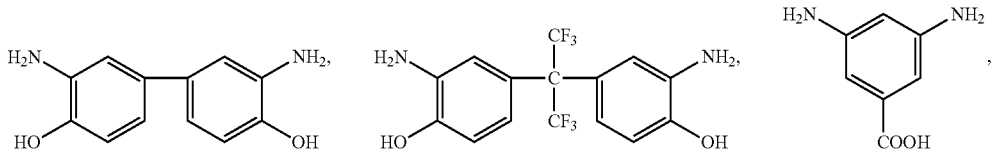

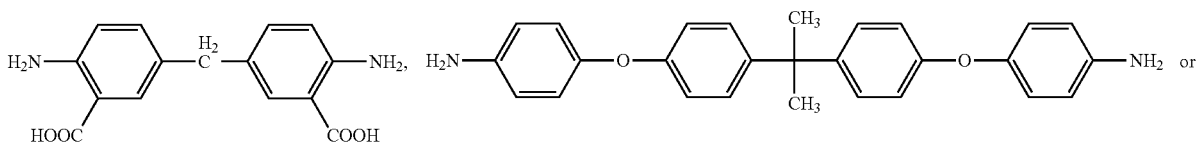

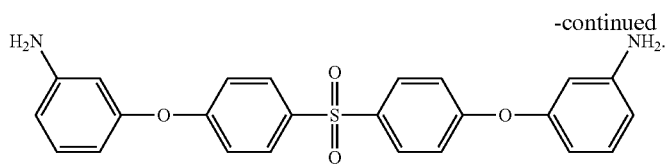

The dianhydride may be

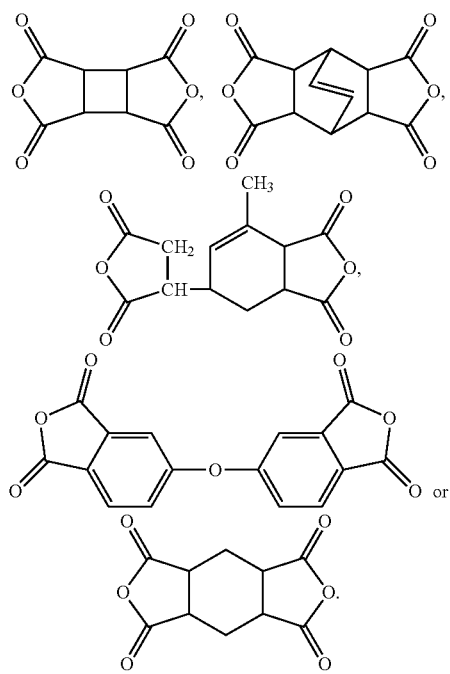

In an embodiment, the aniline has a molar ratio of about 10-20%, preferably 15-20%, in the reaction mixture.

Figure 1:
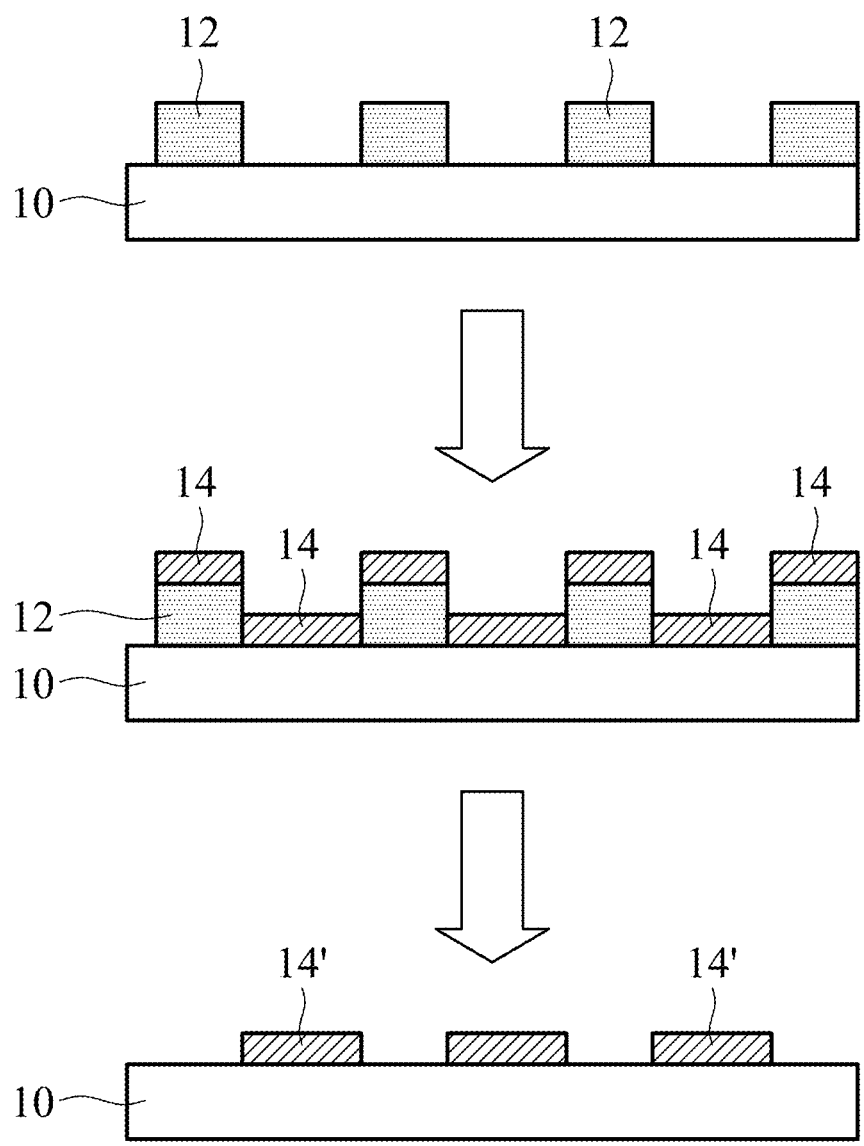
FIG. 1 shows a method for fabricating a patterned metal oxide layer according to one embodiment of the invention.

One embodiment provides a method for fabricating a patterned metal oxide layer, comprising the following steps. Referring to FIG. 1, a substrate 10 is provided. The substrate 10 may be a silicon substrate, a glass substrate or a ceramic substrate. Next, a patterned polyimide layer 12 is formed on the substrate 10. The polyimide layer 12 is prepared by the disclosed method for preparing a polyimide copolymer. In an embodiment, the patterned polyimide layer 12 is formed on the substrate 10 by, for example a printing process. A metal oxide layer 14 is then formed on the substrate 10 and the patterned polyimide layer 12. The metal oxide layer 14 may comprise fluorine-doped tin oxide (FTO), aluminum oxide or indium tin oxide (ITO). In an embodiment, the metal oxide layer 14 is formed on the substrate 10 and the patterned polyimide layer 12 by, for example a deposition process such as a wet deposition process. Next, the patterned polyimide layer 12 is removed to form a patterned metal oxide layer 14'. In an embodiment, the substrate 10 may be placed in an organic solvent to remove (dissolve) the patterned polyimide layer 12 thereon. The organic solvent may comprise N-methyl-2-pyrrolidone (NMP), N,N-dimethyl formamide (DMF), γ-butyrolactone (GBL), dimethyl sulfoxide (DMSO), ethanolamine, catechol or a combination thereof. In an embodiment, before the metal oxide layer 14 is formed on the substrate 10 and the patterned polyimide layer 12, the patterned polyimide layer 12 is further solidified and dried utilizing, for example a hard-baking process.

The molecular weight of the present polyimide (PI) copolymer can be controlled by adjusting the added amount of the end-capped groups thereof during the preparation process such that the polyimide copolymer still has high solubility when in an organic solvent after a high-temperature (350° C. and above) process. Additionally, an inorganic filler can also be added to improve the processability of the polyimide copolymer. In an embodiment, the inorganic filler may be fumed silica.

The present polyimide copolymer serves as a temporary protective film capable of enduring high temperatures (350° C. and above) during a metal oxide patterning process due to the polyimide copolymer still having high solubility when in an organic solvent after the high-temperature (350° C. and above) process. Finally, the polyimide copolymer is simply removed utilizing a solvent to form a metal oxide pattern.

The temporary protective film has the following characteristics: (1) thermal stability, (2) operability and (3) high solubility in a solvent after a high-temperature (350° C. and above) metal oxide deposition process. The temporary protective film mainly comprises polyimide. A patterned temporary protective film is directly formed on a substrate. After drying and a high-temperature (350° C. and above) metal oxide deposition process, the temporary protective film on the substrate is removed utilizing a solvent to form a metal oxide pattern. The present temporary protective film provides a simple, rapid and competitive metal oxide patterning process.

Example 1

Synthesis of the Present Polyimide I 65.9448 g (180 mmol) of 2,2-bis(3-amino-4-hydroxyphenyl) hexafluoropropane (Bis-APAF), 82.1 g (200 mmol) of 2,2-bis[4-(4-aminophenoxy)phenyl]propane (BAPP), 79.4208 g (320 mmol) of bicyclo[2,2,2]oct-7-ene-2,3,5,6-tetracarboxylic dianhydride (B1317), 24.816 g (80 mmol) of 4,4'-oxydiphthalic anhydride (ODPA) and 384 g of N-methyl-2-pyyrolidone (NMP) were added to a 1000-mL tri-necked round-bottomed flask equipped with a mechanical agitator and a nitrogen gas inlet to form a mixing solution. After the mixing solution was stirred at 0° C. for 4 hours, 3.7252 g (40 mmol) of aniline was added to the mixing solution and stirred at room temperature for 4 hours. After 76 g of xylene was added to the mixing solution, the reaction temperature was raised to 180° C. and the mixing solution was continuously stirred for 4 hours. After cooling, a sticky polyimide solution PI-1 was obtained. The average molecular weight, 9,200, of the polyimide was measured by gel permeation chromatography (GPC).

Example 2

Synthesis of the Present Polyimide II 62.2812 g (170 mmol) of 2,2-bis(3-amino-4-hydroxyphenyl) hexafluoropropane (Bis-APAF), 82.1 g (180 mmol) of 2,2-bis[4-(4-aminophenoxyl)phenyl]propanl (BAPP), 79.4208 g (320 mmol) of bicyclo[2,2,2]oct-7-ene-2,3,5,6-tetracarboxylic dianhydride (B1317), 24.816 g (80 mmol) of 4,4'-oxydiphthalic anhydride (ODPA) and 384 g of N-methyl-2-pyyrolidone (NMP) were added to a 1000-mL tri-necked round-bottomed flask equipped with a mechanical agitator and a nitrogen gas inlet to form a mixing solution. After the mixing solution was stirred at 0° C. for 4 hours, 5.5878 g (60 mmol) of aniline was added to the mixing solution and stirred at room temperature for 4 hours. After 76 g of xylene was added to the mixing solution, the reaction temperature was raised to 180° C. and the mixing solution was continuously stirred for 4 hours. After cooling, a sticky polyimide solution PI-2 was obtained. The average molecular weight, 8,350, of the polyimide was measured by gel permeation chromatography (GPC).

Example 3

Synthesis of the Present Polyimide III 58.6176 g (160 mmol) of 2,2-bis(3-amino-4-hydroxyphenyl) hexafluoropropane (Bis-APAF), 82.1 g (180 mmol) of 2,2-bis[4-(4-aminophenoxyl)phenyl]propanl (BAPP), 79.4208 g (320 mmol) of bicyclo[2,2,2]oct-7-ene-2,3,5,6-tetracarboxylic dianhydride (B1317), 24.816 g (80 mmol) of 4,4'-oxydiphthalic anhydride (ODPA) and 384 g of N-methyl-2-pyyrolidone (NMP) were added to a 1000-mL tri-necked round-bottomed flask equipped with a mechanical agitator and a nitrogen gas inlet to form a mixing solution. After the mixing solution was stirred at 0° C. for 4 hours, 7.4504 g (80 mmol) of aniline was added to the mixing solution and stirred at room temperature for 4 hours. After 76 g of xylene was added to the mixing solution, the reaction temperature was raised to 180° C. and the mixing solution was continuously stirred for 4 hours. After cooling, a sticky polyimide solution PI-3 was obtained. The average molecular weight, 7,400, of the polyimide was measured by gel permeation chromatography (GPC).

Example 4

Synthesis of the Present Polyimide IV 25.8655 g (170 mmol) of 3,5-diaminobenzoic acid (DABZ), 86.5 g (200 mmol) of 2,2-bis[4-(3-aminophenoxyl)phenyl]sulfone (m-BAPS), 99.276 g (400 mmol) of Bicyclo[2,2,2]oct-7-ene-2,3,5,6-tetracarboxylic dianhydride (B1317) and 325 g of N-methyl-2-pyyrolidone (NMP) were added to a 1000-mL tri-necked round-bottomed flask equipped with a mechanical agitator and a nitrogen gas inlet to form a mixing solution. After the mixing solution was stirred at 0° C. for 4 hours, 5.5878 g (60 mmol) of aniline was added to the mixing solution and stirred at room temperature for 4 hours. After 65 g of xylene was added to the mixing solution, the reaction temperature was raised to 180° C. and the mixing solution was continuously stirred for 4 hours. After cooling, a sticky polyimide solution PI-4 was obtained. The average molecular weight, 6,850, of the polyimide was measured by gel permeation chromatography (GPC).

Example 5

Synthesis of the Present Polyimide V

The synthesis method of this example was similar to that of Example 2. Bicyclo[2,2,2]oct-7-ene-2,3,5,6-tetracarboxylic dianhydride (B1317) and 4,4'-oxydiphthalic anhydride (ODPA) were replaced by 105.6 g (400 mmol) of 5-(2,5-dioxotetrahydrol)-3-methyl-3-cyclohexene-1,2-dicarboxylic anhydride (B-4400). A sticky polyimide solution PI-5 was obtained. The average molecular weight, 7,100, of the polyimide was measured by gel permeation chromatography (GPC).

Example 6

Synthesis of the Present Polyimide VI

The synthesis method of this example was similar to that of Example 4. Bicyclo[2,2,2]oct-7-ene-2,3,5,6-tetracarboxylic dianhydride (B1317) was replaced by 105.6 g (400 mmol) of 5-(2,5-dioxotetrahydrol)-3-methyl-3-cyclohexene-1,2-dicarboxylic anhydride (B-4400). A sticky polyimide solution PI-6 was obtained. The average molecular weight, 6,550, of the polyimide was measured by gel permeation chromatography (GPC).

Example 7

Synthesis of the Present Polyimide VII

The synthesis method of this example was similar to that of Example 4. 3,5-diaminobenzoic acid (DABZ) was replaced by 48.671 g (170 mmol) of methylene bis(anthranilic acid) (MBAA). A sticky polyimide solution PI-7 was obtained. The average molecular weight, 6,620, of the polyimide was measured by gel permeation chromatography (GPC).

Example 8

Synthesis of the Present Polyimide VIII

The synthesis method of this example was similar to that of Example 1. 2,2-bis(3-amino-4-hydroxyphenyl) hexafluoropropane (Bis-APAF) was replaced by 38.916 g (180 mmol) of 3,3-dihydroxybenzidine (HAB). A sticky polyimide solution PI-8 was obtained. The average molecular weight, 10,200, of the polyimide was measured by gel permeation chromatography (GPC).

Comparative Example 1

Synthesis of Conventional Polyimide I 73.272 g (200 mmol) of 2,2-bis(3-amino-4-hydroxyphenyl) hexafluoropropane (Bis-APAF), 82.1 g (200 mmol) of 2,2-bis[4-(4-aminophenoxyl)phenyl]propanl (BAPP), 79.4208 g (320 mmol) of bicyclo[2,2,2]oct-7-ene-2,3,5,6-tetracarboxylic dianhydride (B1317), 24.816 g (80 mmol) of 4,4'-oxydiphthalic anhydride (ODPA) and 605 g of N-methyl-2-pyyrolidone (NMP) were added to a 1000-mL tri-necked round-bottomed flask equipped with a mechanical agitator and a nitrogen gas inlet to form a mixing solution. After the mixing solution was stirred at 0° C. for 4 hours, 121 g of xylene was added to the mixing solution and the reaction temperature was raised to 180° C. and the mixing solution was continuously stirred for 4 hours. After cooling, a sticky polyimide solution PI-C1 was obtained. The average molecular weight, 65,000, of the polyimide was measured by gel permeation chromatography (GPC).

Comparative Example 2

Synthesis of Conventional Polyimide II 69.6084 g (190 mmol) of 2,2-bis(3-amino-4-hydroxyphenyl) hexafluoropropane (Bis-APAF), 82.1 g (200 mmol) of 2,2-bis[4-(4-aminophenoxyl)phenyl]propanl (BAPP), 79.4208 g (320 mmol) of bicyclo[2,2,2]oct-7-ene-2,3,5,6-tetracarboxylic dianhydride (B1317), 24.816 g (80 mmol) of 4,4'-oxydiphthalic anhydride (ODPA) and 384 g of N-methyl-2-pyyrolidone (NMP) were added to a 1000-mL tri-necked round-bottomed flask equipped with a mechanical agitator and a nitrogen gas inlet to form a mixing solution. After the mixing solution was stirred at 0° C. for 4 hours, 1.8626 g (20 mmol) of aniline was added to the mixing solution and stirred at room temperature for 4 hours. After 76 g of xylene was added to the mixing solution, the reaction temperature was raised to 180° C. and the mixing solution was continuously stirred for 4 hours. After cooling, a sticky polyimide solution PI-C2 was obtained. The average molecular weight, 19,000, of the polyimide was measured by gel permeation chromatography (GPC).

Comparative Example 3

Synthesis of Conventional Polyimide III 54.954 g (150 mmol) of 2,2-bis(3-amino-4-hydroxyphenyl) hexafluoropropane (Bis-APAF), 82.1 g (200 mmol) of 2,2-bis[4-(4-aminophenoxyl)phenyl]propanl (BAPP), 79.4208 g (320 mmol) of bicyclo[2,2,2]oct-7-ene-2,3,5,6-tetracarboxylic dianhydride (B1317), 24.816 g (80 mmol) of 4,4'-oxydiphthalic anhydride (ODPA) and 384 g of N-methyl-2-pyyrolidone (NMP) were added to a 1000-mL tri-necked round-bottomed flask equipped with a mechanical agitator and a nitrogen gas inlet to form a mixing solution. After the mixing solution was stirred at 0° C. for 4 hours, 9.313 g (100 mmol) of aniline was added to the mixing solution and stirred at room temperature for 4 hours. After 76 g of xylene was added to the mixing solution, the reaction temperature was raised to 180° C. and the mixing solution was continuously stirred for 4 hours. After cooling, a sticky polyimide solution PI-C3 was obtained. The average molecular weight, 5,200, of the polyimide was measured by gel permeation chromatography (GPC).

Comparative Example 4

Synthesis of Conventional Polyimide IV 53.2 g (200 mmol) of diamino-1-(4-aminophenyl)-1,3,3-trimethyl indane (DAPI), 64.444 g (200 mmol) of 3,3',4,4'-benzophenonetetracarboxylic dianhydride and 470 g of N-methyl-2-pyyrolidone (NMP) were added to a 1000-mL tri-necked round-bottomed flask equipped with a mechanical agitator and a nitrogen gas inlet to form a mixing solution. After the mixing solution was stirred at 0° C. for 4 hours, 94 g of xylene was added to the mixing solution and the reaction temperature was raised to 180° C. and the mixing solution was continuously stirred for 4 hours. After cooling, a sticky polyimide solution PI-C4 was obtained. The average molecular weight, 130,000, of the polyimide was measured by gel permeation chromatography (GPC).

TABLE 1

| | Added amount of terminal aniline (mol %) | Average molecular weight (GPC) | Solubility test (after 400° C. baking) | Film profile (400° C. baking for 30 minutes) |
|---|---|---|---|---|
| Example 1 | 10 | 9,200 | Dissolved | No cracking |
| Example 2 | 15 | 8,350 | Dissolved | No cracking |
| Example 3 | 20 | 7,400 | Dissolved | No cracking |
| Example 4 | 15 | 6,850 | Dissolved | No cracking |
| Example 5 | 15 | 7,100 | Dissolved | No cracking |
| Example 6 | 15 | 6,550 | Dissolved | No cracking |
| Example 7 | 15 | 6,620 | Dissolved | No cracking |
| Example 8 | 10 | 10,200 | Dissolved | No cracking |
| Com. Example 1 | 0 | 65,000 | Undissolved | No cracking |
| Com. Example 2 | 5 | 19,000 | Undissolved | No cracking |
| Com. Example 3 | 25 | 5,200 | Dissolved | Cracking |
| Com. Example 4 | 0 | 130,000 | Undissolved | No cracking |

*After the polyimide film was baked at 400° C. for 30 minutes, the solubility test was performed at 120° C. utilizing the solvent (DMSO/EA = 3:7) for 30 minutes.

Example 9

Preparation of the Patterned Metal Oxide Layer I

Figure 2:
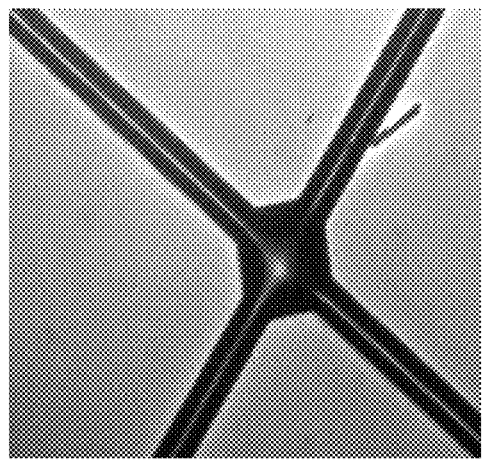
FIG. 2 is a SEM diagram which shows fluorine-doped tin oxide (FTO) being sprayed on a polyimide pattern according to one embodiment of the invention.
Figure 3:
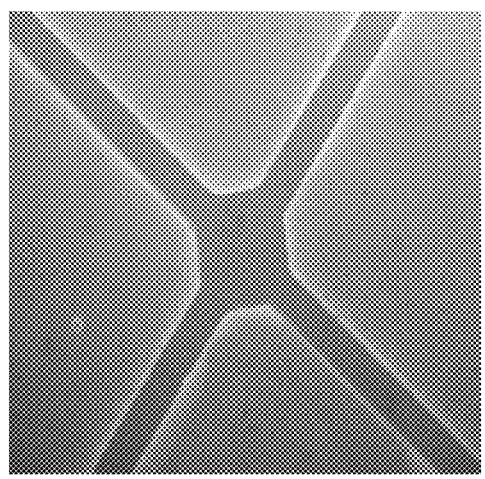
FIG. 3 is a SEM diagram of fluorine-doped tin oxide (FTO) pattern after stripping the polyimide pattern as shown in FIG. 2 according to one embodiment of the invention.

The polyimide solution PI-1 prepared from Example 1 was printed on a glass substrate and dried at 230° C. for 30 minutes to form a 7.3 μm-thick polyimide pattern. Next, fluorine-doped tin oxide (FTO) was sprayed (deposition temperature: 400° C., time: 5-10 minutes) on the glass substrate with the polyimide pattern formed thereon to form a fluorine-doped tin oxide (FTO) film, as shown in FIG. 2. Finally, the glass substrate was immersed in a 120° C. solution (dimethyl sulfoxide (DMSO)/ethanolamine (EA)=3:7) to simultaneously remove the polyimide and the fluorine-doped tin oxide (FTO) deposited on the surface of the polyimide, as shown in FIG. 3. A 240 nm-thick patterned fluorine-doped tin oxide (FTO) film with a sheet resistance of 32.3 Ω/sq on the glass substrate was thus obtained.

Example 10

Preparation of the Patterned Metal Oxide Layer II

Figure 4:
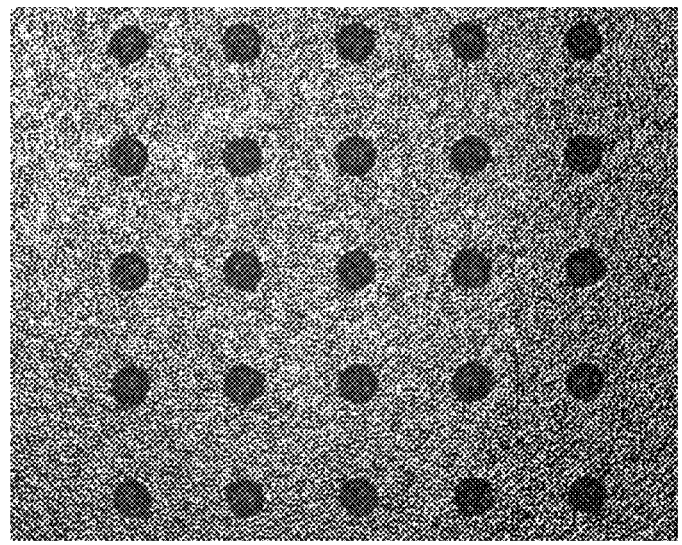
FIG. 4 is a SEM diagram which shows aluminum oxide being sprayed on a polyimide pattern according to one embodiment of the invention.
Figure 5:
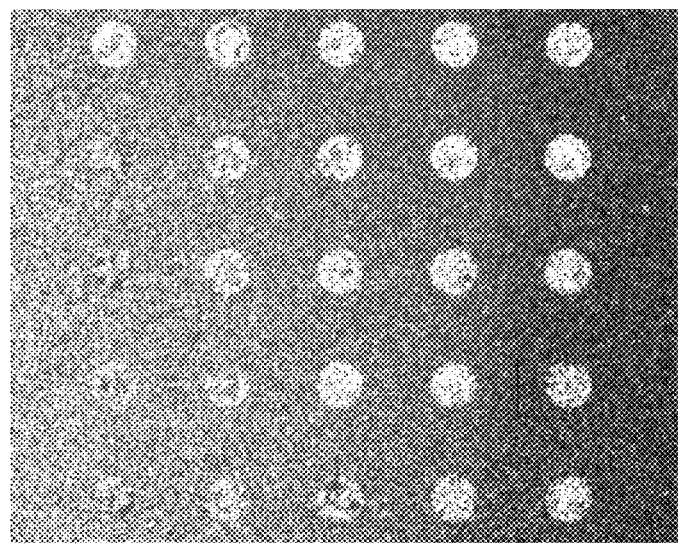
FIG. 5 is a SEM diagram of aluminum oxide pattern after stripping the polyimide pattern as shown in FIG. 4 according to one embodiment of the invention.

The preparation method of this example was similar to that of Example 9. The polyimide solution PI-1 prepared from Example 1 was printed on a silicon substrate and dried at 250° C. for 30 minutes to form a 15 μm-thick polyimide pattern. Next, aluminum oxide was sprayed (deposition temperature: 350° C., time: 15 minutes) on the silicon substrate with the polyimide pattern formed thereon to form an aluminum oxide film, as shown in FIG. 4. Finally, the silicon substrate was immersed in a 120° C. solution (DMSO/EA=3:7) to simultaneously remove the polyimide and the aluminum oxide deposited on the surface of the polyimide, as shown in FIG. 5. A 100 nm-thick patterned aluminum oxide film on the silicon substrate was thus obtained.

Comparative Example 5

Stripping Test I for Conventional Polyimide Material

The test method of this example was similar to the method of Example 9. The polyimide solution PI-C1 prepared from Comparative Example 1 was printed on a glass substrate and dried at 230° C. for 30 minutes to form an 8.3 μm-thick polyimide pattern. Next, fluorine-doped tin oxide (FTO) was sprayed (deposition temperature: 400° C., time: 5-10 minutes) on the glass substrate with the polyimide pattern formed thereon to form a fluorine-doped tin oxide (FTO) film. Finally, the glass substrate was immersed in a 120° C. solution (DMSO/EA=3:7). However, the polyimide on the glass substrate was not able to be dissolved completely.

Comparative Example 6

Stripping Test II for Conventional Polyimide Material

The test method of this example was similar to the method of Example 10. The polyimide solution PI-C1 prepared from Comparative Example 1 was printed on a silicon substrate and dried at 250° C. for 30 minutes to form an 18 μm-thick polyimide pattern. Next, aluminum oxide was sprayed (deposition temperature: 350° C., time: 15 minutes) on the silicon substrate with the polyimide pattern formed thereon to form an aluminum oxide film. Finally, the silicon substrate was immersed in a 120° C. solution (DMSO/EA=3:7). However, the polyimide on the silicon substrate was not able to be dissolved completely.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A polyimide copolymer represented by formula (I) or formula (II):

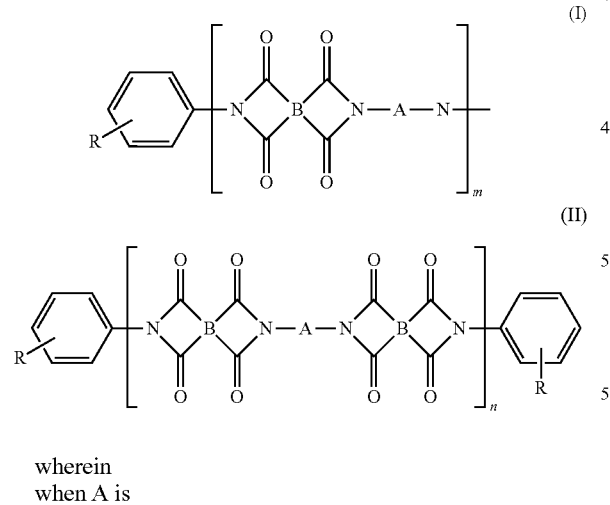

wherein
when A is

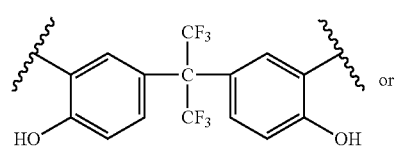

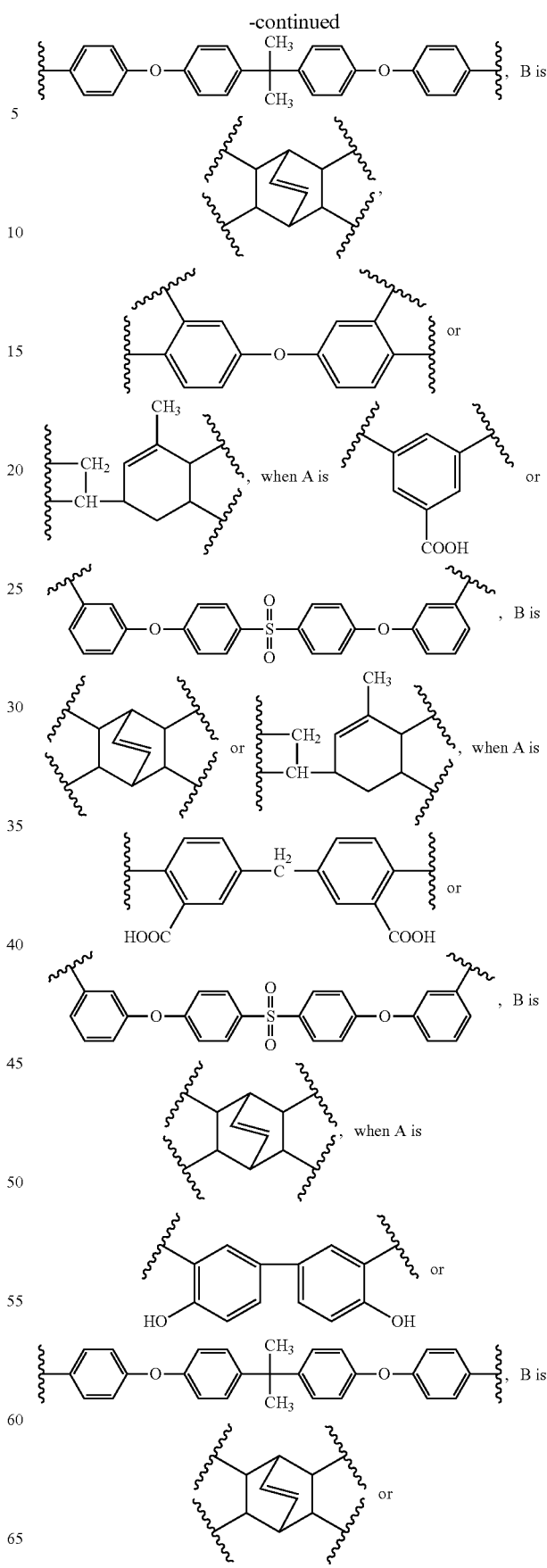

-continued

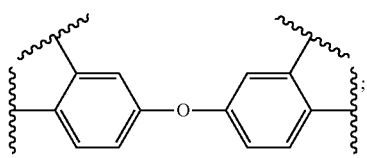

R is hydrogen or phenyl; and m and n are 20-50.

2. The polyimide copolymer as claimed in claim 1, wherein the polyimide copolymer has an aniline terminal.

3. The polyimide copolymer as claimed in claim 1, wherein the polyimide copolymer has a weight-average molecular weight of about 6,000-15,000.

4. The polyimide copolymer as claimed in claim 1, wherein the polyimide copolymer has a weight-average molecular weight of about 6,000-12,000.

5. A method for preparing a polyimide copolymer, comprising:

mixing a diamine (A) and a dianhydride (B) together to form a polyimide precursor, wherein when A is

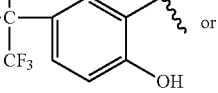

-continued mixing an aniline and the polyimide precursor together to form a reaction mixture; and imidizing the reaction mixture to prepare a polyimide copolymer.

6. The method for preparing the polyimide copolymer as claimed in claim 5, wherein the aniline has a molar ratio of about 10-20% in the reaction mixture.

7. The method for preparing the polyimide copolymer as claimed in claim 5, wherein the aniline has a molar ratio of about 15-20% in the reaction mixture.

8. A method for fabricating a patterned metal oxide layer, comprising the following steps:

providing a substrate;

forming a patterned polyimide layer on the substrate, wherein the polyimide layer is prepared by the method for preparing the polyimide copolymer as claimed in claim 5;

forming a metal oxide layer on the substrate and the patterned polyimide layer; and removing the patterned polyimide layer to form a patterned metal oxide layer.

9. The method for fabricating a patterned metal oxide layer as claimed in claim 8, wherein the aniline has a molar ratio of about 10-20% in the reaction mixture in the method for preparing the polyimide copolymer.

10. The method for fabricating a patterned metal oxide layer as claimed in claim 8, wherein the substrate comprises silicon, glass or ceramic.

11. The method for fabricating a patterned metal oxide layer as claimed in claim 8, wherein the patterned polyimide layer is formed on the substrate by a printing process.

12. The method for fabricating a patterned metal oxide layer as claimed in claim 8, wherein the metal oxide layer comprises fluorine-doped tin oxide (FTO), aluminum oxide or indium tin oxide (ITO).

13. The method for fabricating a patterned metal oxide layer as claimed in claim 8, wherein the metal oxide layer is formed on the substrate and the patterned polyimide layer by a deposition process.

14. The method for fabricating a patterned metal oxide layer as claimed in claim 8, wherein the patterned polyimide layer is removed by placing the substrate in an organic solvent.

15. The method for fabricating a patterned metal oxide layer as claimed in claim 14, wherein the organic solvent comprises N-methyl-2-pyrrolidone (NMP), N,N-dimethyl formamide (DMF), γ-butyrolactone (GBL), dimethyl sulfoxide (DMSO), ethanolamine, catechol or a combination thereof.

16. The method for fabricating a patterned metal oxide layer as claimed in claim 8, further comprising hard-baking the patterned polyimide layer before the metal oxide layer is formed on the substrate and the patterned polyimide layer.

* * * * *